(12) United States Patent
Schulte et al.

(10) Patent No.: US 8,479,791 B2
(45) Date of Patent: Jul. 9, 2013

(54) AUTOMATIC TIRE INFLATION SYSTEM

(75) Inventors: Jeff Anthony Schulte, Encino, CA (US); Curt Anthony Schulte, Santa Clarita, CA (US); Anthony Joseph Schulte, Encino, CA (US); Jill Schulte Slauson, Castaic, CA (US)

(73) Assignee: The Brothers Company, Santa Clarita, CA (US)

( * ) Notice: Subject to any disclaimer, the term of this patent is extended or adjusted under 35 U.S.C. 154(b) by 361 days.

(21) Appl. No.: 12/901,927

(22) Filed: Oct. 11, 2010

(65) Prior Publication Data

US 2012/0018070 A1    Jan. 26, 2012

Related U.S. Application Data

(63) Continuation-in-part of application No. 12/804,589, filed on Jul. 26, 2010, now abandoned.

(51) Int. Cl.
*B60C 23/10* (2006.01)

(52) U.S. Cl.
USPC .......................................... 152/419; 152/421

(58) Field of Classification Search
USPC .......................................... 152/419, 421, 423
See application file for complete search history.

(56) References Cited

U.S. PATENT DOCUMENTS

| | | | |
|---|---|---|---|
| 4,418,737 A | 12/1983 | Goodell et al. | |
| 4,431,043 A | 2/1984 | Goodell et al. | |
| 4,470,506 A | 9/1984 | Goodell et al. | |
| 4,651,792 A | 3/1987 | Taylor | |
| 4,924,926 A | 5/1990 | Schultz et al. | |
| 5,355,924 A | 10/1994 | Olney | |
| 5,556,489 A | 9/1996 | Curlett et al. | |
| 5,584,949 A | 12/1996 | Ingram | |
| 5,647,927 A | 7/1997 | Mason | |
| 5,767,398 A | 6/1998 | Naedler | |
| 6,269,691 B1 | 8/2001 | Sowatzke et al. | |
| 6,401,743 B1 | 6/2002 | Naedler | |
| 6,425,427 B1 | 7/2002 | Stech | |
| 6,435,238 B1 | 8/2002 | Hennig | |
| 6,691,754 B1 * | 2/2004 | Moore | 152/419 |
| 6,698,482 B2 | 3/2004 | Hennig et al. | |
| 6,880,598 B2 | 4/2005 | Haunhorst et al. | |
| 7,197,422 B2 | 3/2007 | Gaunt et al. | |
| 7,201,066 B1 | 4/2007 | Stone et al. | |
| 7,357,164 B2 | 4/2008 | Loewe | |
| 7,748,422 B2 | 7/2010 | Bol | |

* cited by examiner

*Primary Examiner* — Jason Bellinger

(74) *Attorney, Agent, or Firm* — Trojan Law Offices

(57) ABSTRACT

This is an invention for a system and method of automatically inflating the wheels of a vehicle during driving operation. When air pressure in a wheel of the vehicle decreases below a pre-determined limit, a solenoid device is activated to extend a kick-rod. As the wheel rotates, a pump mounted on the wheel strikes the kick-rod of the solenoid device, thereby causing air to be injected into the wheel. The automatic tire inflation system works by employing the mechanical energy of the rotating wheel to drive the pump upon contact with the solenoid device.

11 Claims, 7 Drawing Sheets

AUTOMATIC TIRE INFLATION SYSTEM

CROSS-REFERENCE TO RELATED APPLICATION

This application is a continuation-in-part of U.S. Ser. No. 12/804,589 filed Jul. 26, 2010 now abandoned.

TECHNICAL FIELD

This invention relates generally to a system and method for tire inflation and, more particularly, to a system and method for automatically maintaining pressure in vehicular tires during operation.

BACKGROUND OF THE INVENTION

It is well known that driving on underinflated tires can adversely affect a vehicle's performance, and thus it is a primary safety concern. According to a report by the Department of Transportation's National Highway Traffic Safety Administration, more than a quarter of automobiles and light trucks in United States have one or more tires underinflated below the level recommended by the vehicle manufacturer. Vehicles with underinflated tires have been shown to have handling problems that result in significant numbers of highway fatalities and injuries. Under-inflation is also a primary cause of early tire breakdown and poor tread life, which shortens tire life, resulting in increased maintenance costs. In addition to contributing to safety hazards and maintenance costs, it has also been shown that driving on underinflated tires can significantly decrease fuel economy. Therefore, the proper monitoring and regulation of tire pressure can increase tire life, reduce fuel consumption, and improved handling and ultimate safety.

SUMMARY OF THE INVENTION

Accordingly, it is an object of the present invention to provide an automatic tire inflation system to properly maintain tire pressure.

It is a further object of the present invention to provide a tire inflation system that does not require an operator to manually inflate the tire.

It is a further object of the present invention to provide a tire inflation system that automatically inflates the tire during operation.

In accordance with the objects of the invention, an automatic tire inflation system is comprised of a system of sensors that are connected to a pressure-monitoring device, which communicates with an electronic controller to activate electric solenoid devices that, in turn, actuate pumps affixed to the wheels of a vehicle.

Each wheel of the vehicle is provided with a pump. The commercial name of the pump will be known as JAMM pump, which does not refer to any specific function of the device. The pump is inserted into the wheel such that it rotates with the tire during operation. When air pressure in any one of the vehicle's four tires falls below a pre-determined limit as determined by sensors connected to the wheels, a pressure-monitoring device transmits the information to an electronic controller. The electronic controller activates a corresponding solenoid device associated with that wheel. The activation of the solenoid device causes it to extend a kick-rod. As the pump rotates with the wheel during operation, it strikes the extended kick-rod, causing the pump to compress, thereby injecting air into the tire. In this way, the mechanical energy of the rotating wheel is used to drive the pump upon contact with the solenoid kick-rod. Thus, with each revolution of the wheel, the pump functions to inject a burst of air into the tire. This process is repeated with each revolution of the wheel until the tire is inflated to an acceptable level.

More particularly, the pump is comprised of a piston movably connected to a valve body. The pump operates as the piston to effect an intake stroke and a compression stroke. On the intake stroke, the piston is actuated by contact with the solenoid kick-rod to draw outside air into an intake chamber in the valve body of the pump. On the compression stroke after contact with the solenoid kick-rod, the piston is pushed by an internal spring in the valve body into a closed position to seal the intake chamber. As the piston returns to the closed position, the air inside the intake chamber is compressed into a compression chamber inside the piston, where it is forced through a needle valve and into the cavity of the tire. Since the pump strikes the extended kick-rod once with each revolution of the wheel, the pump undergoes one cycle of intake stroke and compression stroke during each revolution. Hence, each revolution of the wheel results in an injection of air into the tire. This is repeated until the tire is inflated to an acceptable level as determined by a sensor. Once the tire is properly inflated, the pressure-monitor communicates with the electronic controller to cease activation of the solenoid device, thus concluding the process.

This and other advantages of the present invention will become apparent from a reading of the following description of the preferred embodiments taken in connection with the attached drawings.

DETAILED DESCRIPTION OF THE INVENTION

Figure 1:
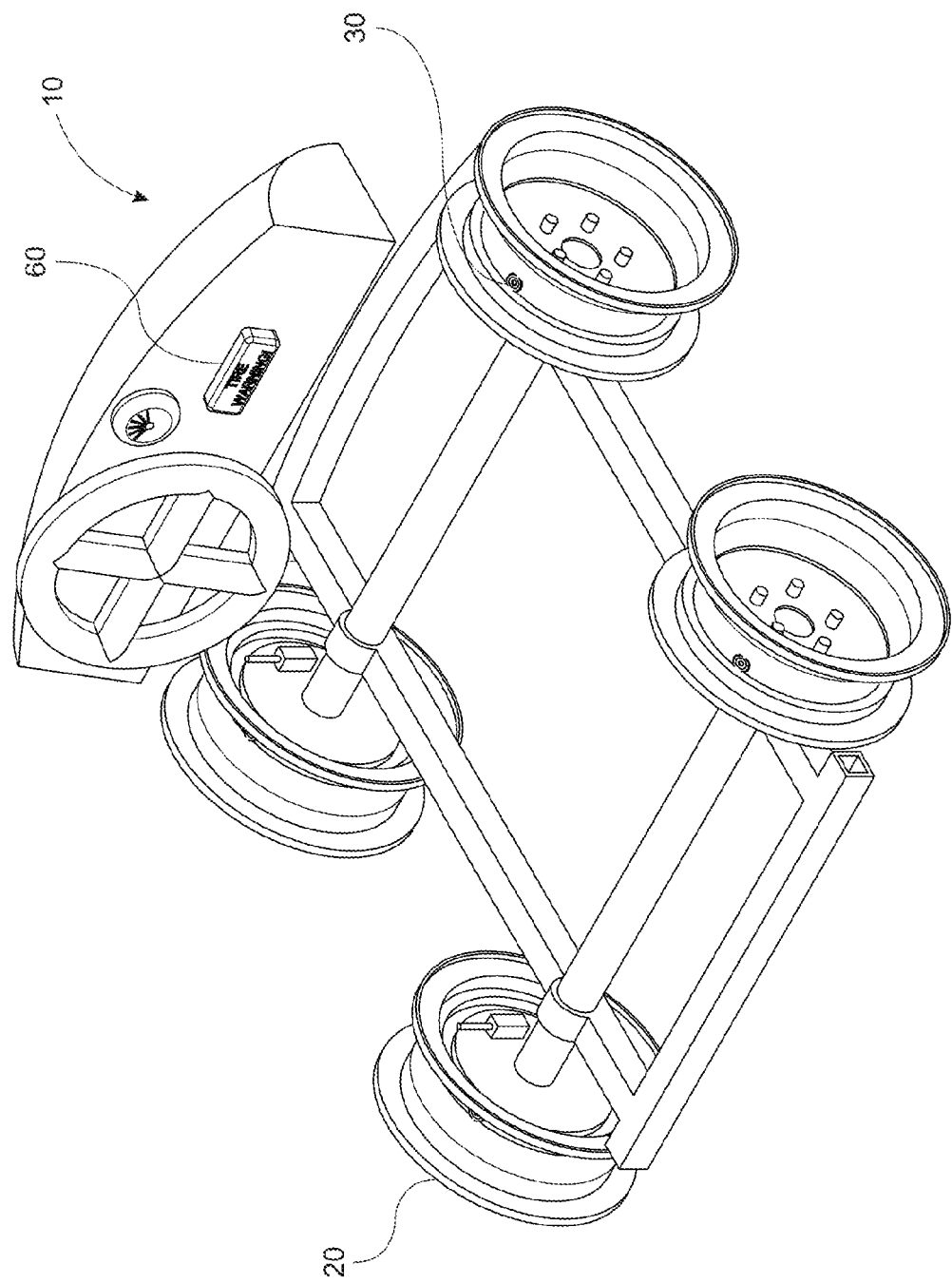
FIG. 1 is a perspective view of selected components of a model vehicle having an automatic tire inflation system according to the present invention.

FIG. 1 shows an automatic tire inflation system 1 according to the present invention for a prototypical vehicle 10 having four wheels 20. While the invention is described in reference to four-wheeled vehicles (e.g. cars, trucks, utility vehicles), the tire inflation system 1 of the present invention can be applied to two-wheeled vehicles (e.g. motorcycles) and three-wheeled vehicles (e.g. all-terrain vehicles) as well.

The automatic tire inflation system 1 includes a sensor 30 of a type well-known in the art for measuring the air pressure of wheel 20. In a preferred embodiment of the invention, four sensors 30 measure the pressure in each of the four wheels 20. Though the sensors 30 of this embodiment are direct sensors that monitor the actual pressure of wheels 20, it is within the contemplation of the invention to employ indirect sensors that can measure the rotational speeds of wheels 20 to determine the "apparent" air pressure of wheels 20.

Figure 2:
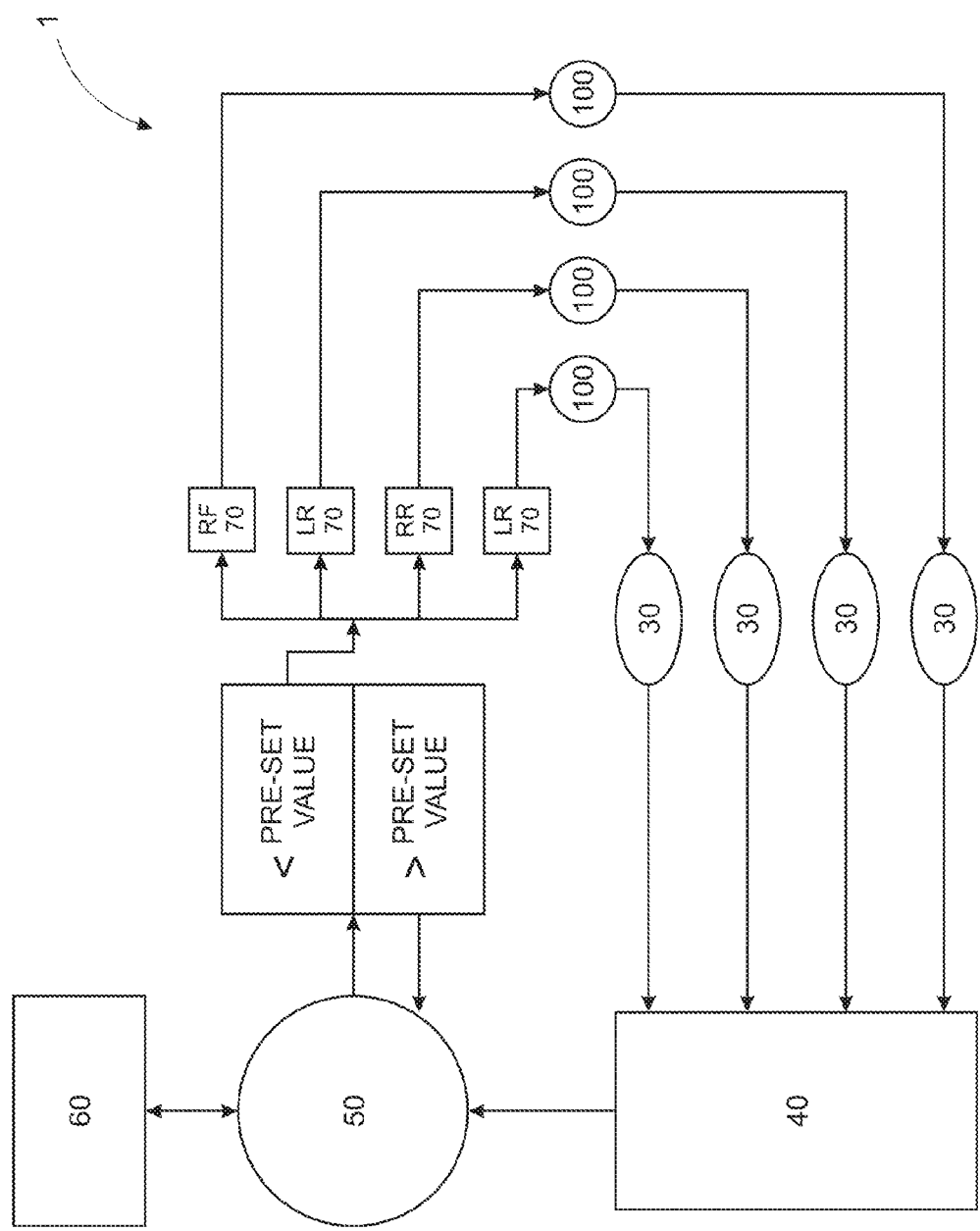
FIG. 2 is a schematic of the system of sensors, monitoring device, electronic controller, digital panel, solenoid devices, and pumps.

As shown in the schematic of FIG. 2, each of the four remote sensors 30 communicates information to a pressure-monitoring device 40. The pressure-monitoring device 40 is connected to an electronic controller 50. In the preferred embodiment, electronic controller 50 communicates with a programmable digital panel 60 in the vehicle to display the air pressure information to the driver.

Figure 3:
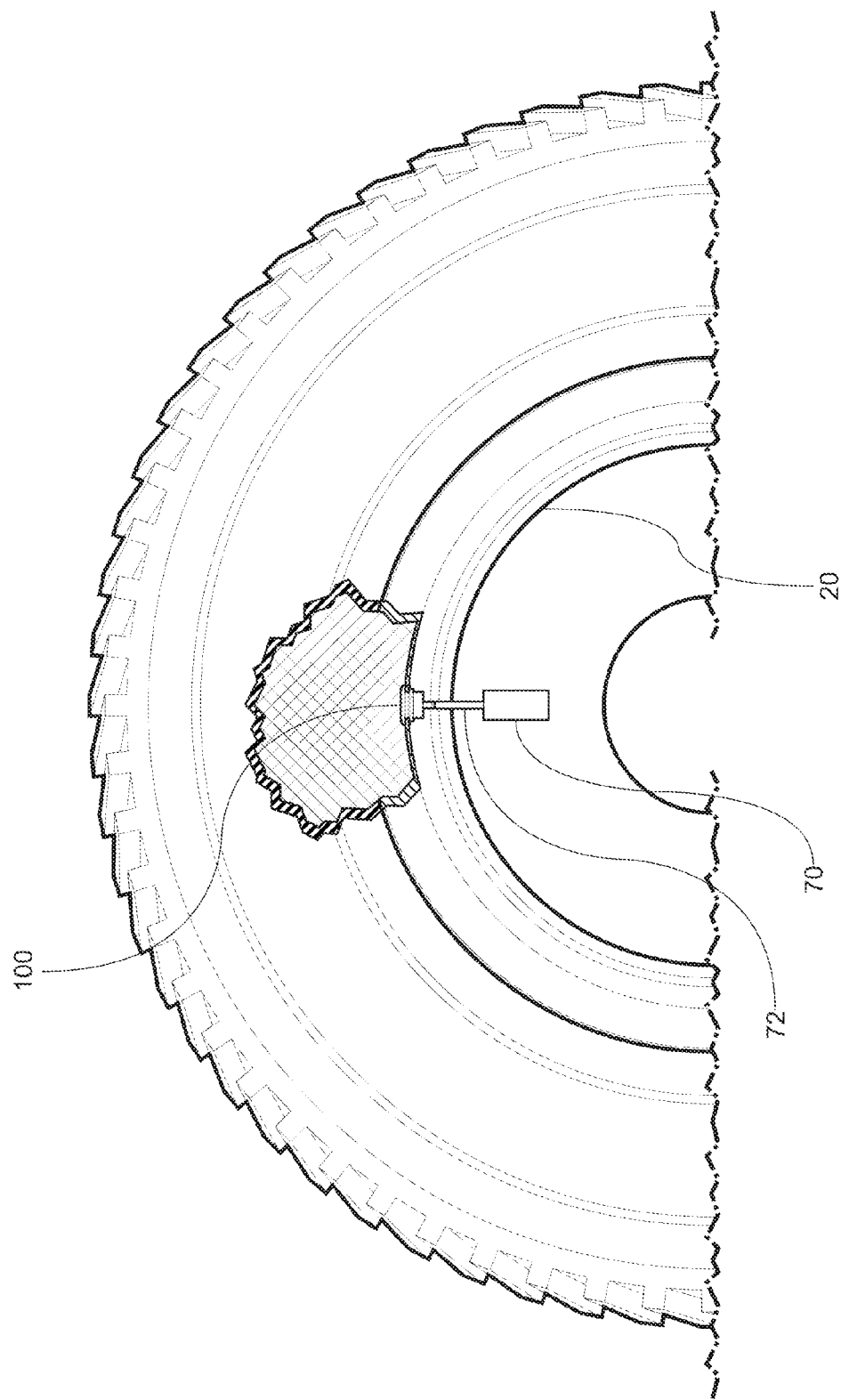
FIG. 3 is a partial breakout side view of a wheel showing the positioning of the pump and the solenoid device.
Figure 4:
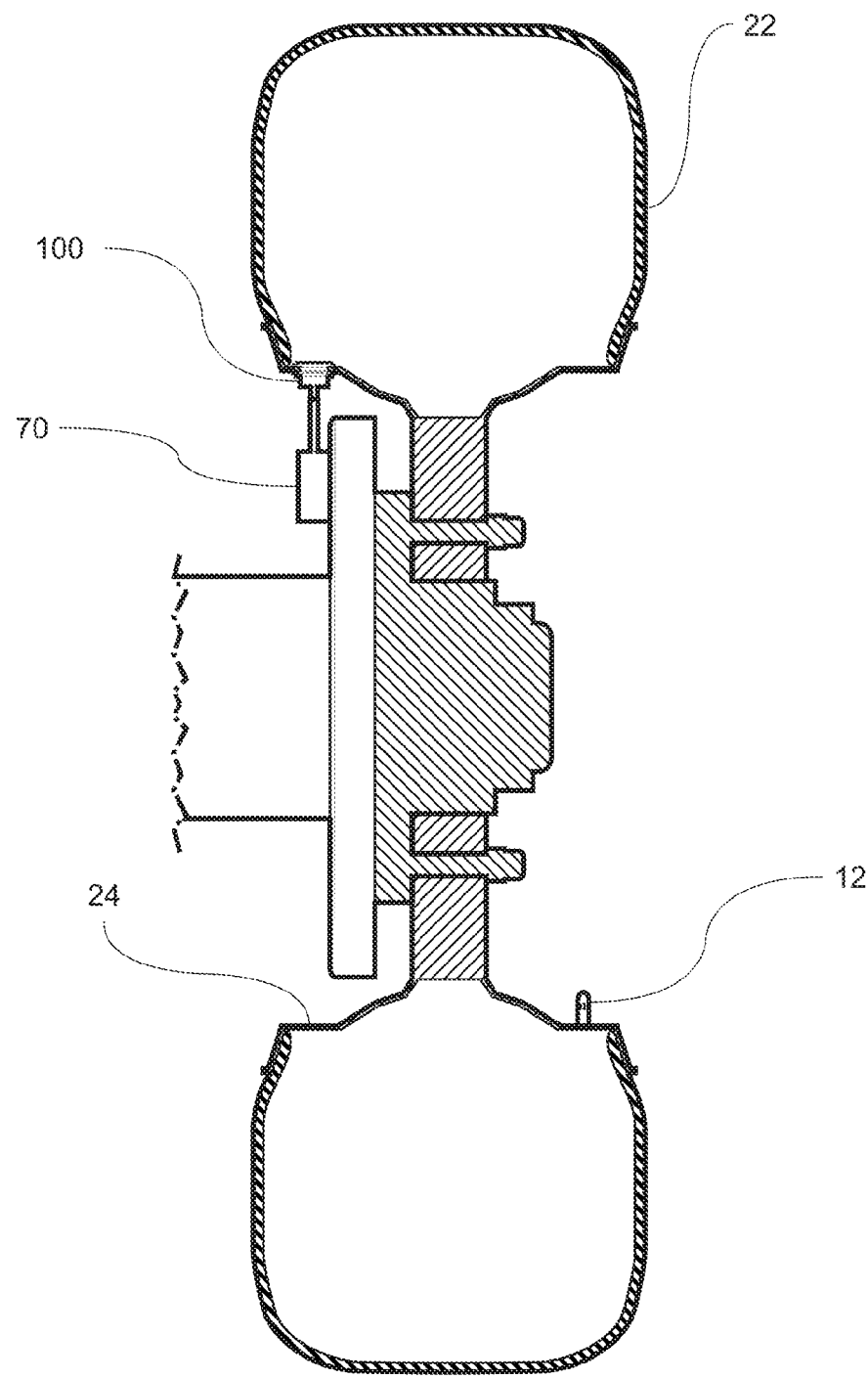
FIG. 4 is a front sectional view of a wheel showing the positioning of the pump and the solenoid device.

If the air pressure in any of the four wheels 20 falls below a preset level, electronic controller 50 activates a corresponding solenoid device 70 associated with the underinflated wheel. As shown in FIG. 3, a solenoid device 70 is mounted in proximity to each wheel 20. In the preferred embodiment as shown in FIG. 4, solenoid device 70 can be mounted on a brake assembly or other suitable location to function for the intended purpose as described herein. Each solenoid device 70 has a kick-rod 72 that extends upon activation. Kick-rod 72 can be maintained in the extended position until electronic controller 50 deactivates solenoid device 70 to retract kick-rod 72. Or, alternatively, kick-rod 72 can automatically retract after each extension.

The activation of solenoid device 70 causes kick-rod 72 to extend to contact a pump 100 mounted on wheel 20. As shown in FIG. 4, pump 100 is affixed in a wall 24 of wheel 20. It is preferably affixed to the base of the wheel 20, adjacent to where the tire sits against the rim. Further, pump 100 is preferably located diametrically opposite of air valve 12 as shown in FIG. 4 in order to counterbalance air valve 12. Pump 100 is affixed in wall 24 by an elastomeric seal 110, a top washer 120, and a retainer nut 130. Alternatively, pump 100 can be affixed by a grommet (not shown) or other common methods known in the art.

Figure 5:
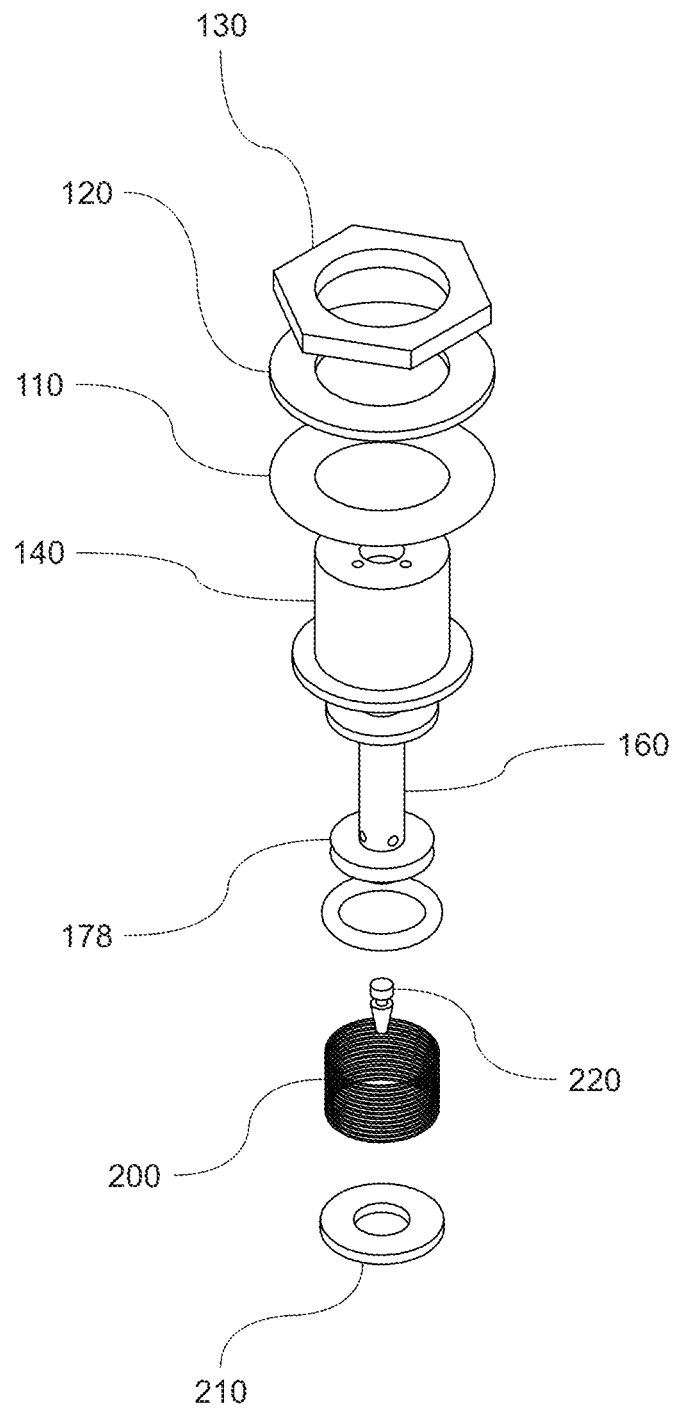
FIG. 5 is an exploded view of the pump.

Pump 100 has a valve body 140 that is inserted into wall 24 of tire 22. As shown in FIG. 5, valve body 140 is cylindrical, having an internal end 142, an external end 144, and walls 146 that define an intake chamber 148.

Valve body 140 is inserted into tire 22 with internal end 142 oriented towards the inside of tire 22 and external end 144 oriented towards the outside of tire 22. Valve body 140 has a plurality of intake ports 150 on external end 144 for drawing ambient air into intake chamber 148. In the preferred embodiment, four intake ports 150 are symmetrically located on external end 144.

Figure 6A:
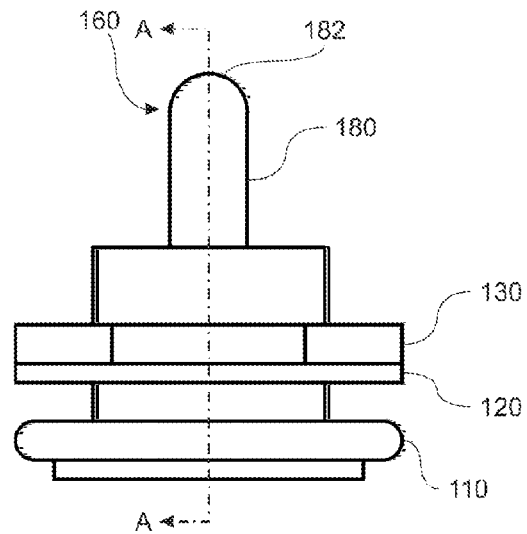
FIG. 6a is a front view of an embodiment of the pump.
Figure 6B:
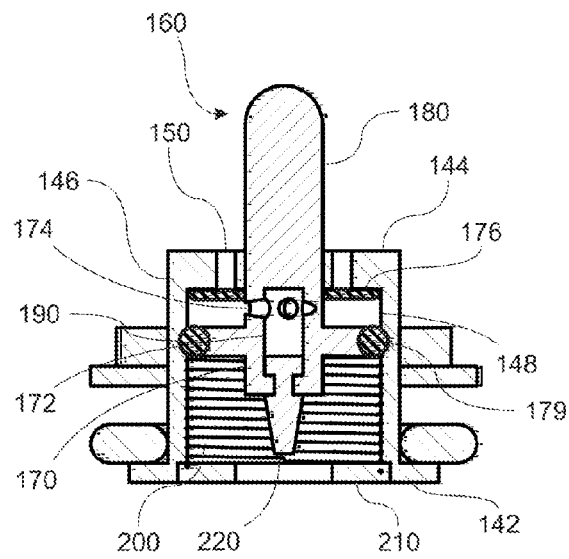
FIG. 6b is a front sectional view of an embodiment of the pump.

Referring now to FIGS. 6a and 6b, a piston 160 is moveably connected to valve body 140. Piston 160 is comprised of plunger 170 and rod 180.

Plunger 170 is located in intake chamber 148 of valve body 140. Plunger 170 has compression chamber 172 that communicates with intake chamber 148 via transition ports 174.

An elastomeric flat seal 176 is mounted on plunger 170. Elastomeric flat seal 176 is interposed between intake ports 150 and transition ports 174, such that elastomeric flat seal 176 functions to close intake ports 150 when piston 160 is inactive. Plunger 170 also has flange 176 that is interposed between transition ports 174 and internal end 142 of valve body 140. Flange 178 has a concave edge 179 to accommodate an o-ring 190, which forms a seal against the inside wall of intake chamber 148. Flange 178 abuts against a spring 200, which sits between flange 178 and a retainer ring 210 that is affixed to internal end 142 of valve body 140. A standard needle valve 220 is connected to plunger 170 for communicating with the inside cavity of tire 22.

Figure 7:
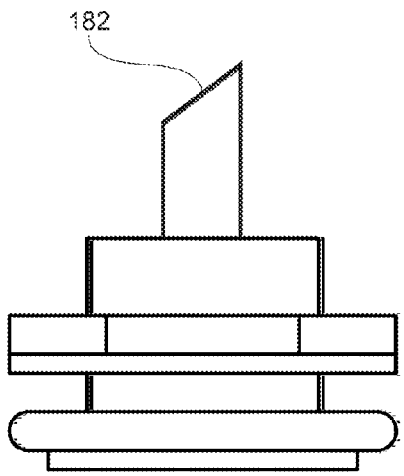
FIG. 7 is a front view of another embodiment of the pump.
Figure 8C:
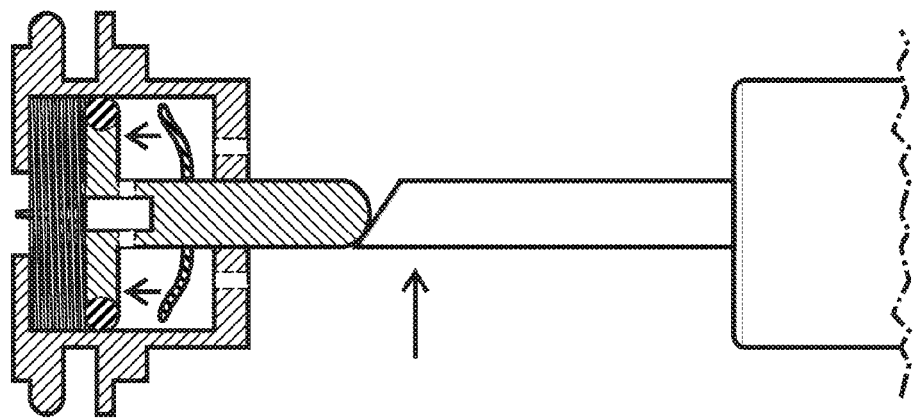
FIG. 8c is a partial view of the solenoid device in contact with the pump.
Figure 8B:
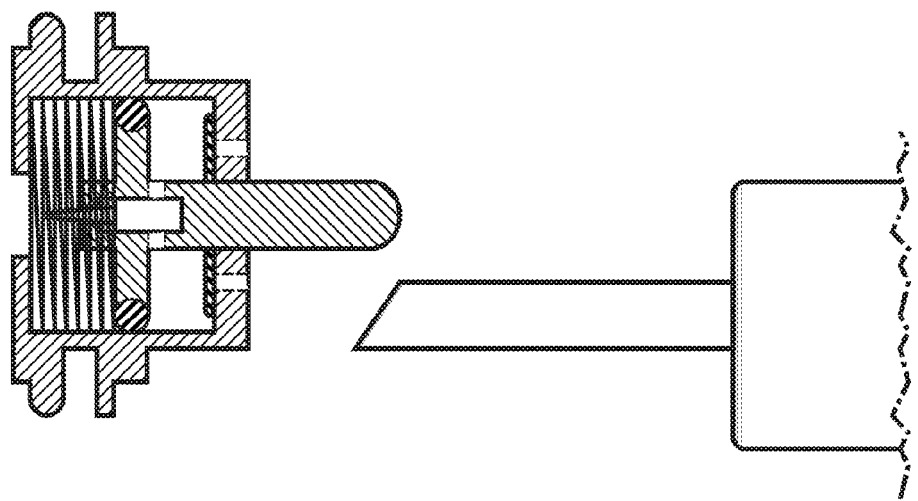
FIG. 8b is a partial view of the solenoid device in the activated state in relation to an embodiment of the pump.
Figure 8A:
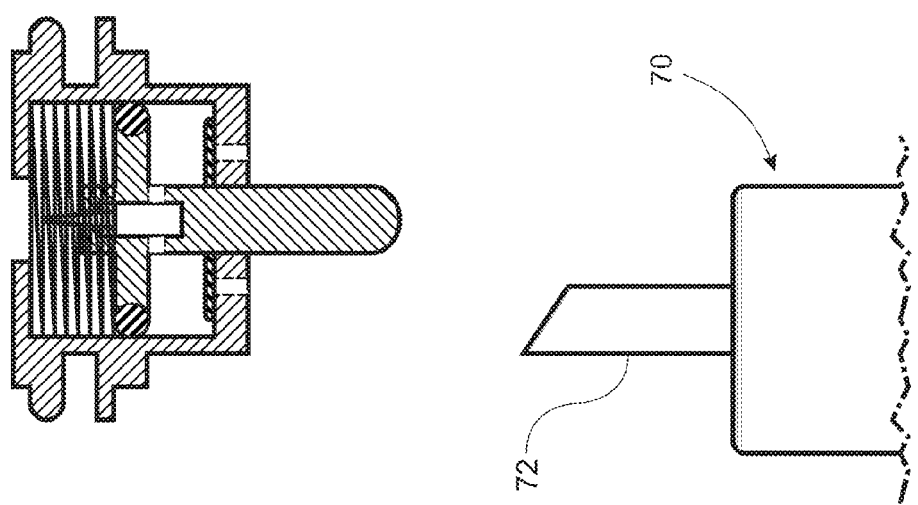
FIG. 8a is a partial view of the solenoid device in the inactivated state in relation to an embodiment of the pump.

Rod 180, which extends outside of valve body 140, has a distal end 182. Distal end 182 can be rounded, as shown in FIG. 6a, or beveled, as shown in FIG. 7, or of any other such shape that upon contact with kick-rod 72 it travels as shown in FIGS. 8a-c.

When air pressure in wheel 20 decreases below a pre-determined level, pressure-monitoring device 40 signals electronic controller 50 to activate solenoid device 70. Upon activation, solenoid device 70 extends kick-rod 72 as shown in FIG. 8b. When extended, kick-rod 70 strikes distal end 182 of piston 160 with each revolution of wheel 20, causing piston 160 to be depressed as shown in FIG. 8c. Kick-rod 72 can be maintained in the extended position such that it continually strikes piston 160 with each revolution until tire 22 is inflated. When tire 22 is properly inflated, electronic controller 50 deactivates solenoid device 70, thereby retracting kick-rod 72. Alternatively, kick-rod 72 can automatically retract after each extension, such that electronic controller 50 must activate solenoid device 70 for each revolution of wheel 20 until tire 22 is inflated.

The depression of piston 160 draws outside air in through intake ports 150. The negative pressure created in intake chamber 148 by depression of piston 160 causes elastomeric flat seal 176 to flex as shown in FIG. 8c, allowing the drawn air to enter intake chamber 148. After contact with solenoid device 70, spring 200 urges piston 160 to the closed position by pushing the elastomeric flat seal 176 against the intake ports 150 to effectively seal intake chamber 148.

As piston 160 returns to the closed position, the air inside intake chamber 148 passes through transition ports 174 to enter compression chamber 172, where it is it is forced through needle valve 220 and into the cavity of tire 22, thereby inflating wheel 20. The process is repeated with each revolution of wheel 20 until the air pressure reaches an acceptable pre-determined level. When wheel 20 is properly inflated as determined by sensor 30 and pressure-monitor 40, electronic controller 50 ceases to activate solenoid device 70, thus concluding the process.

While the invention has been described in reference to certain preferred embodiments thereof, it is to be understood that that the foregoing description is not intended to limit the invention to those embodiments. Reasonable variation and modification are possible within the scope of the foregoing disclosure and drawings without departing from the spirit of the invention, which is defined by the appended claims.

We claim:

1. An automatic tire inflation system for a vehicle comprising:
   a sensor for monitoring the pressure of a wheel on said vehicle;
   an electronic controller in communication with said sensor;
   a solenoid device capable of being activated by said electronic controller, said solenoid device having a kick-rod that extends upon activation;
   a pump mounted to said wheel, said pump capable of being actuated by contact with said solenoid device;
   wherein, when said air pressure in said wheel decreases below a pre-determined level, said sensor signals said electronic controller to activate said solenoid device, causing said kick-rod to extend and contact said pump as said pump rotates with said wheel, thereby causing air to be injected into said wheel.

2. An automatic tire inflation system according to claim 1 further comprising a plurality of sensors, each sensor being attached to each wheel of said vehicle, said sensors communicating with said electronic controller, which displays said pressure on a digital panel in said vehicle.

3. An automatic tire inflation system according to claim 2 further comprising a plurality of solenoid devices, each solenoid device being associated with each sensor for each wheel of said vehicle.

4. An automatic tire inflation system according to claim 1 further comprising:
   said solenoid device being mounted to a part of said vehicle such that it remains stationary in relation to the rotation of said wheel;
   said pump being mounted to said wheel such that said pump rotates with said wheel, said pump having a movable piston;
   wherein said kick-rod of said solenoid device contacts said piston to actuate said pump as said pump rotates with said wheel.

5. An automatic tire inflation system according to claim 4 wherein said pump contacts said solenoid device once per revolution of said wheel, such that each actuation of said pump is completed within one cycle of revolution of said wheel.

6. An automatic tire inflation system according to claim 1 wherein said electronic controller continues to activate said solenoid device to actuate said pump until said air pressure in said wheel reaches a pre-determined level, whereupon said electronic controller signals said solenoid device to cease activation.

7. An automatic tire inflation system according to claim 1 wherein said pump further comprises:
   a valve body, said valve body having at least one intake port;
   a piston moveably connected to said valve body, said piston having a plunger portion and a rod portion, said plunger portion being located inside said valve body and said rod portion being located outside said valve body;
   a spring mounted in said valve body, said spring abutting an end of said plunger portion;
   wherein said piston is capable of moving in a first direction for drawing air through said at least one intake port;
   wherein said piston is capable of moving in a second direction opposite to said first direction under the urging force of said spring.

8. The pump of claim 7 wherein said piston of said pump further comprises:
   at least one transition port in said plunger portion;
   a compression chamber in said plunger portion, said compression chamber communicating with said intake chamber of said valve body;
   a seal mounted on said plunger portion, said seal interposed between said intake port and said transition port, such that said seal functions to close said intake port when said piston is inactive;
   a flange interposed between said transition port and an end of said plunger portion, said flange accommodating an o-ring, which forms a seal against an inside wall of said intake chamber;
   a needle valve connected to said plunger portion for communicating with the inside of said tire;
   wherein, when said piston moves in said second direction under the urging force of said spring, air in said intake chamber passes through said transition port into said compression chamber to be injected through said needle valve into said tire.

9. The pump of claim 7 further comprising a piston wherein said rod has a rounded end such that when said kick-rod contacts said rounded end, said kick-rod causes said piston to move in said first direction.

10. The pump of claim 7 further comprising a piston wherein said rod has a beveled end, such that when said kick-rod contacts said beveled end, said kick-rod causes said piston to move in said first direction.

11. A method for automatically inflating the tire of a vehicle comprising the steps of:
   measuring the pressure of said tire using a sensor;
   determining if said pressure is below a pre-set limit;
   activating a solenoid device if said pressure is below said pre-set limit;
   pumping air into said tire by actuating a pump located within a wall of a wheel rim, said pump actuated by contacting said activated solenoid device as said tire rotates;
   extending a kick-rod from said solenoid device when said solenoid device is activated, such that said kick-rod contacts a piston of said pump, causing said pump to inject air into said tire;
   wherein said actuation of said pump is completed within one cycle of revolution of said tire.

* * * * *